United States Patent Office 3,269,437
Patented August 30, 1966

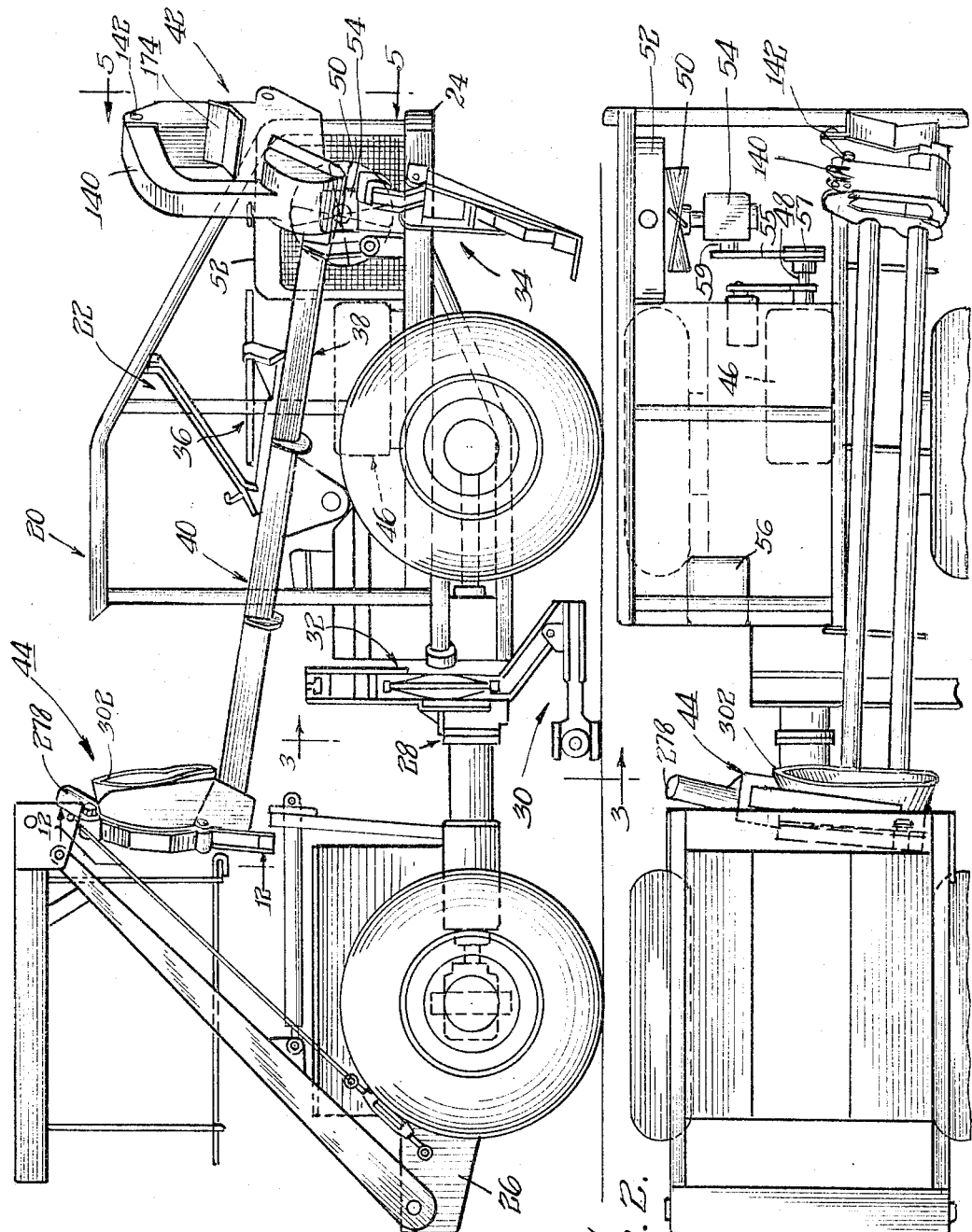

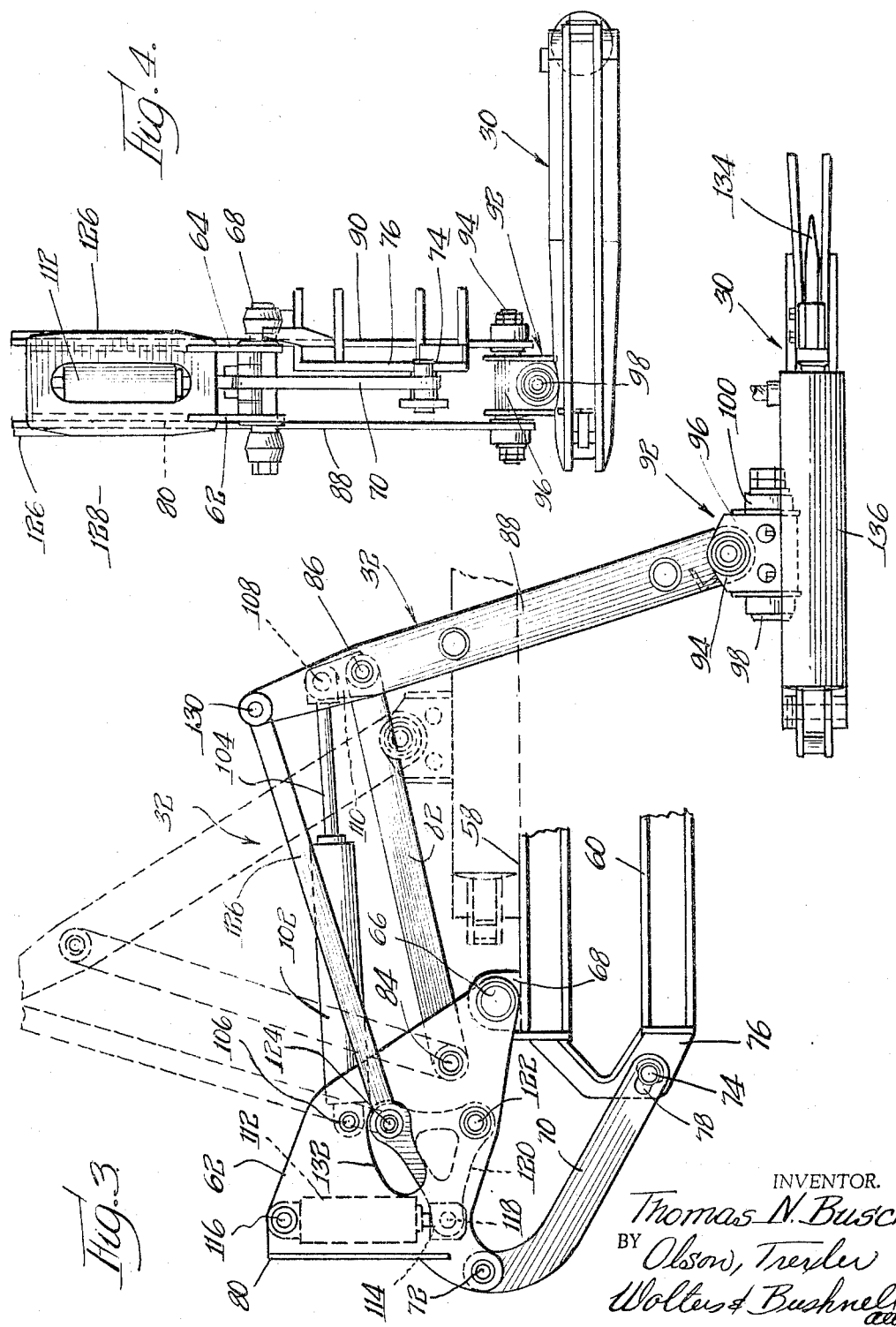

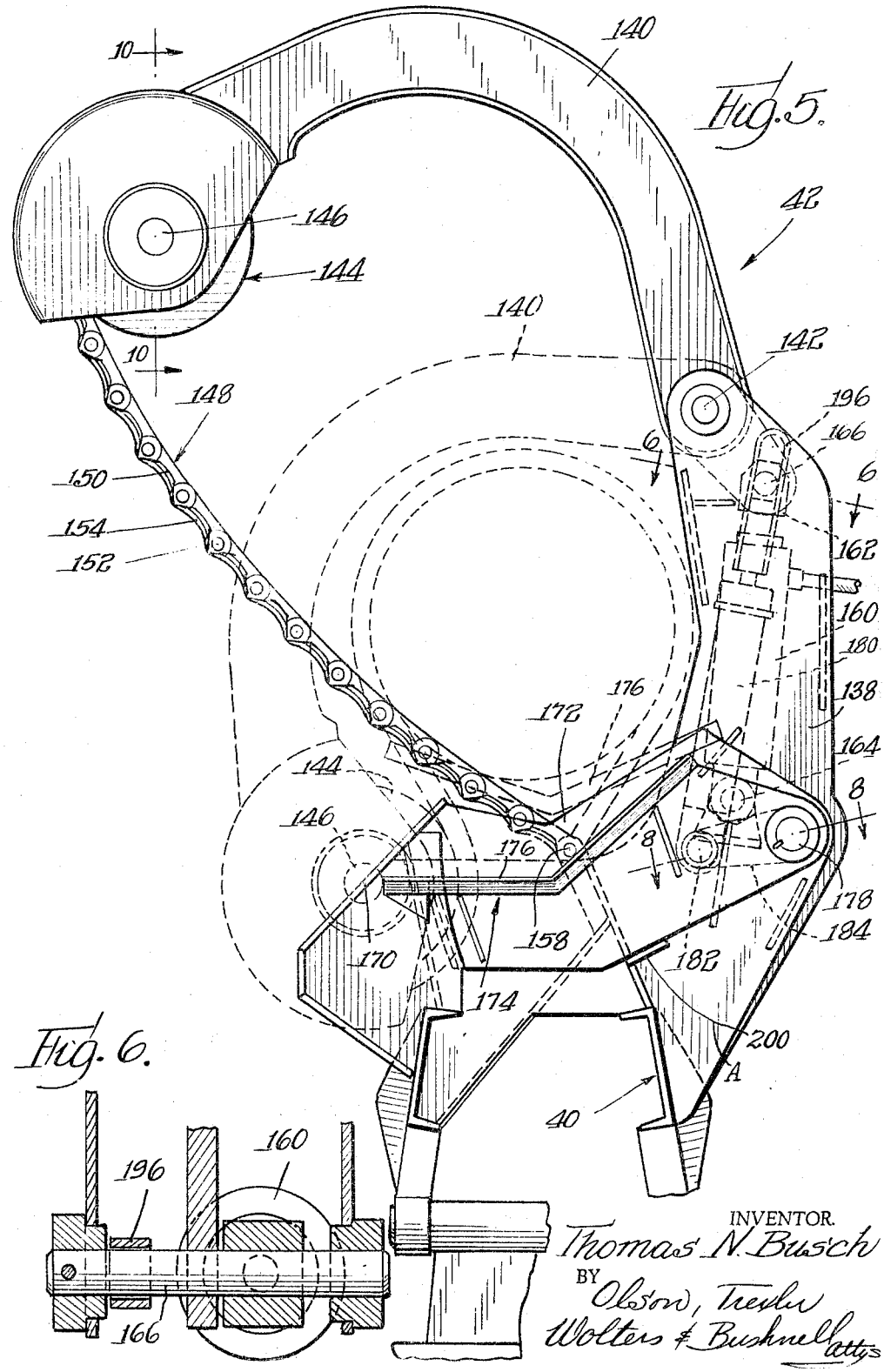

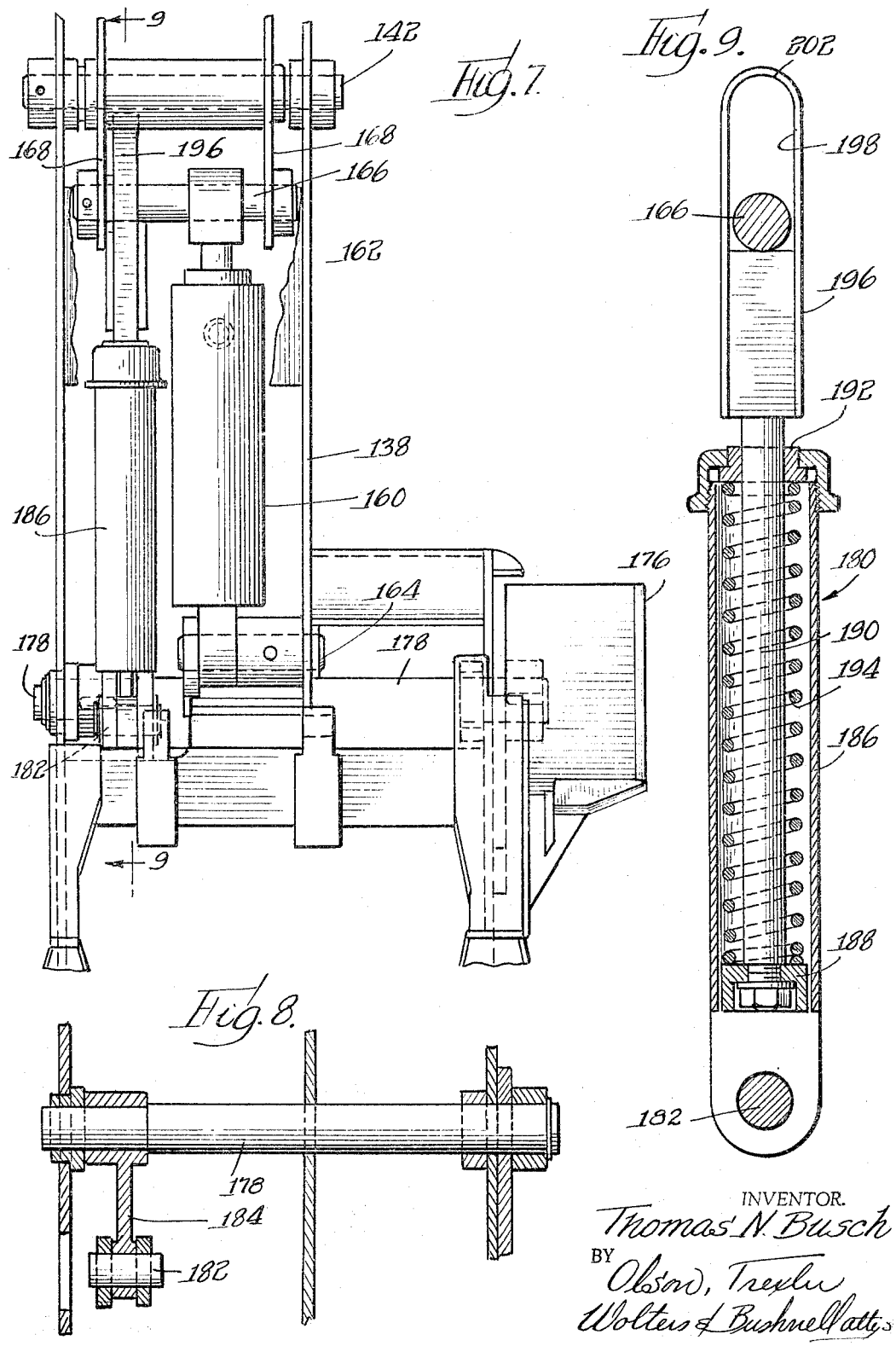

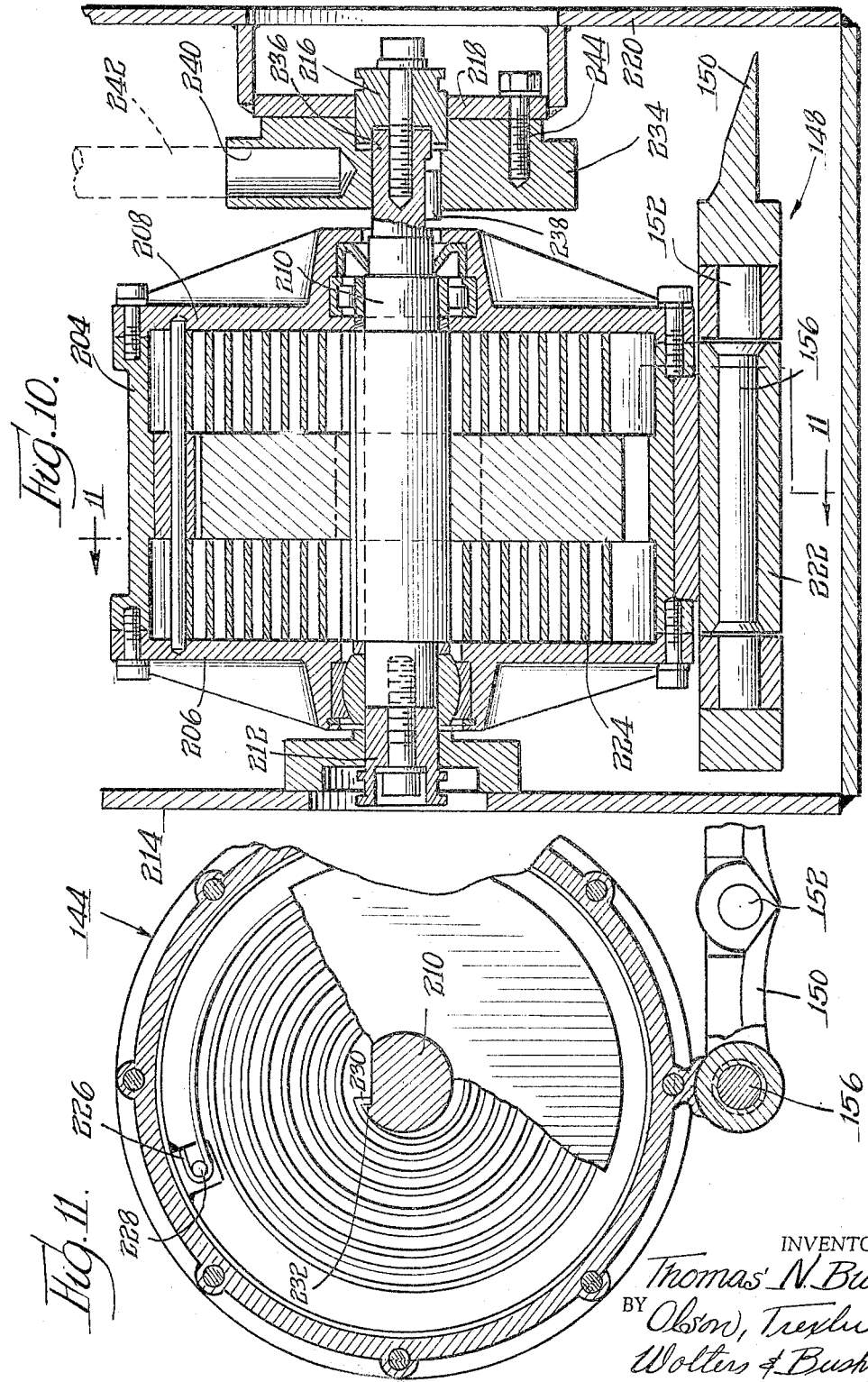

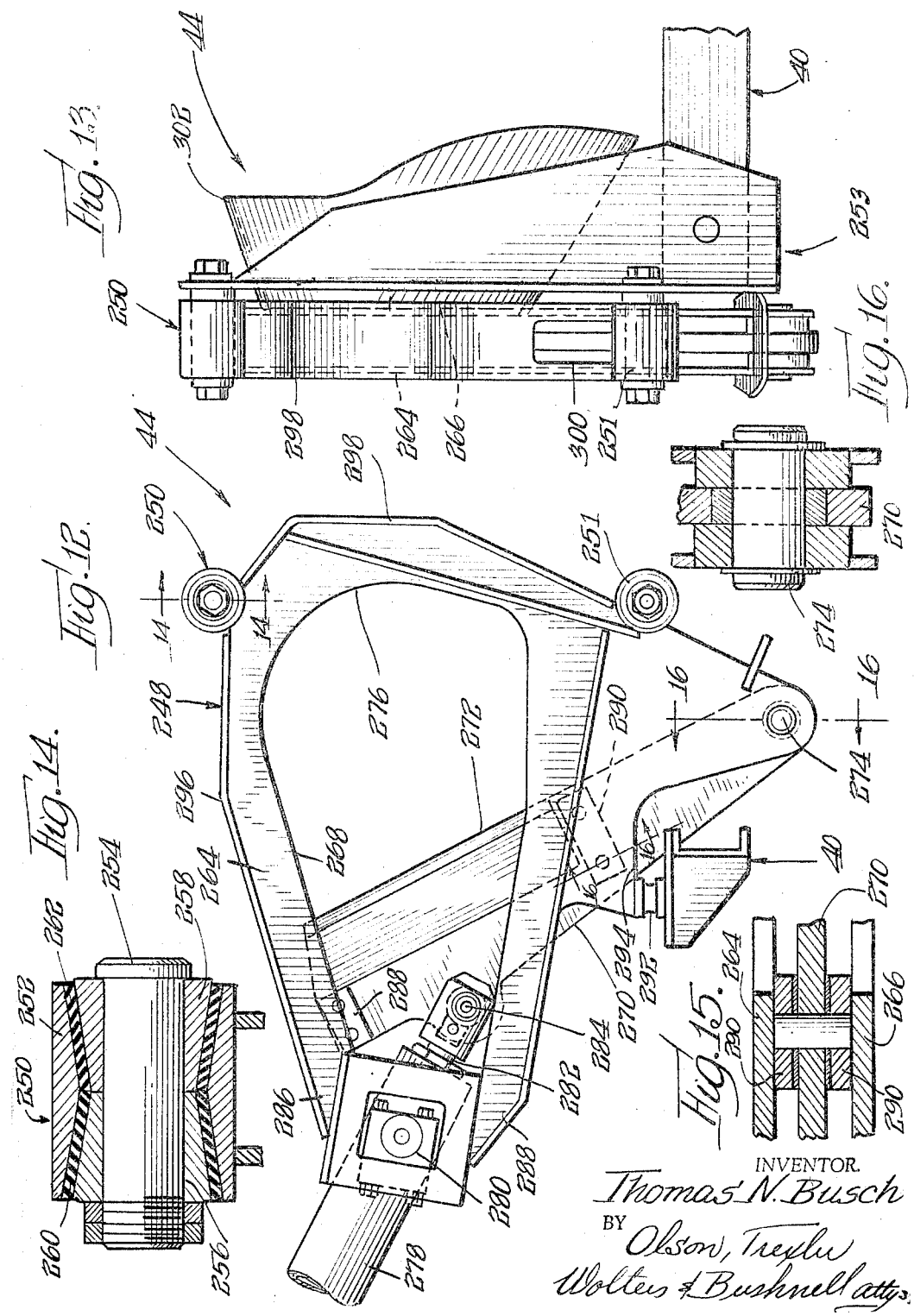

3,269,437
TIMBER HARVESTING APPARATUS
Thomas N. Busch, Daphne, Ala., assignor to Timberline Equipment Company, Dallas, Tex., a corporation of Texas
Filed Oct. 28, 1963, Ser. No. 319,373
18 Claims. (Cl. 144—34)

The present invention relates to a novel apparatus for processing trees, and more specifically to a novel apparatus for harvesting trees.

Tree harvesting apparatuses have heretofore been proposed which include a self-propelled vehicle carrying means for severing and felling a standing tree, and adjustable blade structure for severing branches from a tree during feeding movement of the tree, and means for sectionalizing or bucking the tree and collecting logs in a stack. An important object of the present invention is to provide further improvements in such tree harvesting apparatus for obtaining greater efficiencies and economies and greater reliability.

A more specific object of the present invention is to provide a novel apparatus of the above-described type which is constructed and arranged so as to promote cleaning of tree cutting mechanisms thereof for obtaining more efficient operation.

A still further specific object of the present invention is to provide a novel apparatus of the above-described type wherein fan means on the engine of the self-propelled vehicle is utilized for aiding in cleaning woodchips and the like from portions of the apparatus and is arranged for minimizing any possibility of woodchips and debris from interfering with the proper operation of the engine and its cooling system.

Still another object of the present invention is to provide a novel apparatus of the above-described type having a mechanism for severing branches from a tree constructed for facilitating easier positioning of a tree with the mechanism and for promoting closer conformity of blade means of the mechanism to a tree trunk regardless of variations in the diameters of the tree trunk.

Still another important object of the present invention is to provide a novel apparatus of the above-described type which is constructed for enabling tree cutting or shearing means thereof to be readily assembled or positioned with respect to a standing tree without requiring undue manipulation of the entire self-propelled vehicle or closely accurate positioning of the vehicle with respect to the tree.

A further object of the present invention is to provide an apparatus of the above-described type constructed for promoting easier and more efficient operation of various mechanisms thereof and for minimizing any possibility of damage to the mechanisms.

Other objects and advantages of the present invention will become apparent from the following description and the accompanying drawings wherein;

FIG. 1 is a side-elevational view showing an apparatus incorporating the features of the present invention;

FIG. 2 is a simplified plan view of the apparatus shown in FIG. 1;

FIG. 3 is a fragmentary sectional view taken generally along line 3—3 in FIG. 1 and particularly showing a tree felling shearing head and mounting mechanism therefor incorporated in the apparatus of the present invention;

FIG. 4 is a side-elevational view of the portion of the apparatus shown in FIG. 3;

FIG. 5 is an elevational view taken generally along line 5—5 in FIG. 1 and showing the mechanism for removing limbs from a felled tree;

FIG. 6 is a fragmentary sectional view taken generally along line 6—6 in FIG. 5;

FIG. 7 is a fragmentary side-elevational view of the mechanism shown in FIG. 5 as seen from the left side of FIG. 5;

FIG. 8 is a fragmentary sectional view taken generally along line 8—8 in FIG. 5;

FIG. 9 is an enlarged sectional view taken along line 9—9 in FIG. 7;

FIG. 10 is an enlarged fragmentary sectional view taken generally along line 10—10 in FIG. 5;

FIG. 11 is a sectional view taken along line 11—11 in FIG. 10;

FIG. 12 is a fragmentary view taken generally along line 12—12 in FIG. 1 and showing a shoeing mechanism for bucking or sectionalizing felled trees;

FIG. 13 is a side-elevational view of the mechanism shown in FIG. 12 as viewed from the right side of FIG. 12;

FIG. 14 is an enlarged fragmentary sectional view taken along line 14—14 in FIG. 12;

FIG. 15 is an enlarged fragmentary sectional view taken along line 15—15 in FIG. 12; and FIG. 16 is an enlarged fragmentary sectional view taken along line 16—16 in FIG. 12.

Referring now more specifically to the drawings wherein like parts are designated by the same numerals throughout the various figures, an apparatus 20 incorporating features of the present invention is shown in FIGS. 1 and 2. The apparatus comprises a self-propelled vehicle 22 having a forward tractor section 24 and a trailer section 26. The tractor and trailer sections are interconnected by pivot means 28. The pivot means 28 is of known construction and need not be described in detail and it is sufficient to state that the structure is such as to permit the tractor and trailer sections to pivot relative to each other about both a horizontal longitudinally extending axis and a vertical axis for facilitating manipulation of the vehicle in the woods and over rough terrain.

The apparatus is provided with a first shearing head 30 supported by a mechanism 32 which will be described more in detail below for felling a standing tree. A mechanism 34 is mounted adjacent a forward end of the vehicle for catching a felled tree and raising the tree up on to a carriage 36 of a feeding mechanism 38, which carriage is movable along a track 40. For further details of the construction of the shearing head 30, the lifting mechanism 34 and the feeding mechanism 38 reference is made to my copending application Serial No. 210,368, filed July 17, 1962, now abandoned and the prior applications referred to therein, now Patents Nos. 3,059,677 and 3,196,911.

The apparatus is further provided with a mechanism 42 mounted adjacent the forward end thereof and adapted to sever branches from a tree trunk as the trunk is fed rearwardly along the vehicle by the feeding means 38. The delimbing mechanism 42 is constructed for closely encircling a tree trunk and efficiently severing branches therefrom regardless of variation in the diameter of the trunk as will be described more in detail below.

Adjacent the trailing end of the feeding mechanism track structure 40 is a second shearing head 44. This shearing head is constructed and arranged for efficiently severing successive sections from a tree trunk as will be described hereinafter. The shearing or bucking head 44 is disposed at an elevated position with respect to the trailer or cart section 26 of the vehicle so that sections of a tree will fall directly onto the trailer section when they are severed from the remainder of the tree trunk. For details and construction of the arrangement of the trailer section of the vehicle reference is also made to the aforementioned copending applications.

It has been found that during a tree processing operation, considerable amounts of woodchips, branches, leaves and other debris accumulate at and in the vicinity of the delimbing mechanism 42 which, as previously indicated, is located toward the forward end of the vehicle, As shown in FIG. 2 the forward or tractor section 24 of the vehicle includes an engine 46 of known construction having a forwardly extending shaft 48 from which a fan 50 is driven for drawing air through a radiator 52 forming a part of the cooling system for the engine. It is to be noted that in accordance with a feature of the present invention the radiator 52 is disposed at a side of the vehicle opposite from the delimbing mechanism 42 rather than at the front of the vehicle and the fan 50 is driven by a suitable gearing unit 54 or other drive means from the shaft 48 through an endless belt 55 extending around pulleys 57 and 59 respectively on the shaft 48 and an input shaft of the drive unit 54. In other words, the fan 50 and the radiator 52 are disposed so as to face transversely of the vehicle rather than longitudinally thereof. One result of this arrangement is that the radiator is spaced away from the delimbing mechanism so as to minimize any possibility of leaves and the like clogging and interfering with the proper operation of the radiator. In addition, this location of the radiator provides a weight at one side of the vehicle counterbalancing the weight of the delimbing and related mechanisms at the opposite side of the vehicle whereby to provide a more even load on the wheels of the tractor section which improves the floatation of the wheels and the maneuverability of the vehicle.

Still another important advantage in arrangement of the radiator and fan 50 is that the blast of air provided by the fan 50 is directed substantially at the delimbing mechanism 42 and this blast of air is sufficient to blow chips, loose branches and debris from the delimbing mechanism. In other words, the blast of air directed by the fan serves to clean the delimbing mechanism and adjacent portions of the apparatus for promoting more efficient and reliable operation. It may also be noted that the aforementioned arrangement of the fan causes the blast of air to be directed away from an operator located at the control position 56 so as to improve the comfort of the operator.

The mechanism 32 is mounted on frame members 58 and 60 of the vehicle and comprises upright base members 62 and 64 mounted on shaft 66 which is pivotally and yieldably supported by bearing units 68 on the frame member 58 having internal cushions or rubber sleeves.

The base members 62 and 64 are restrained for limited pivotal movement by a link 70. The link 70 has one end pivotally connected by a shaft 72 with rearwardly extending ear portions of the base members. An opposite end of the link 70 is connected by a pin 74 with bracket means 76 fixed to the machine frame. The pin 74 extends through an elongated slot 78 in the link 70 for permitting limited sliding movement of the link relative to the pin and thus limited pivotal movement of the base members 62 and 64 for the purpose described below. Preferably the base members are reinforced and maintained in spaced apart relationship by a back plate 80 welded to upstanding margins of the base members.

The mechanism 32 is provided with an articulated boom structure including a first member 82 having an end pivoted on a shaft 84 extending between the base members 62 and 64. An outer end of the boom member 82 is pivoted by a shaft 86 to a pair of complementary outer boom members 88 and 90. Lower ends of the outer boom members 88 and 90 are connected to the shearing head 30.

In order to simplify the apparatus and also to facilitate proper positioning of the shearing head structure 30 with respect to a tree to be felled, the lower ends of the boom members 88 and 90 are connected with the shearing head in a manner such that the shearing head is free for substantially universal pivotal movement. At the same time the arrangement is such that the shearing head tends to assume a generally horizontal position. As shown in FIGS. 3 and 4 pivot means 92 is provided for connecting the shearing head with the lower ends of the boom members, which pivot structure includes a first shaft 94 extending between and connected to the lower ends of the boom members 88 and 90 and connected by bearing means 96 to a second shaft 98. The shaft 98 is disposed at right angles to the shaft 94 and is mounted in bearing means 100 which are connected with the shearing head. As previously indicated the universal pivot unit 92 is secured to the shearing head 30 at a location such that the shearing head tends to assume a horizontal position so that it will normally be positioned properly for engagement with a tree to be felled. However, the universal pivotal support for the head enables the head to change its position to accommodate any obstruction during positioning with respect to a tree and also to accommodate any twisting of the head which may occur as the blade of the shearing head is forced through the tree during a tree-felling operation.

The boom structure is adapted to be actuated between the substantially extended position shown in solid lines in FIG. 3 and a retracted position shown in broken lines in FIG. 3. More specifically a hydraulically operated cylinder 102 and cooperating piston rod 104 extend between the base members 62 and 64 and an outer end of the link or boom member 82. One end of the cylinder 102 is connected between the base members 62 and 64 by a shaft 106 and an outer end of the piston rod is connected by a pin 108 to an ear or lug 110 fixed to the outer end of the boom member 82. With this arrangement, extension of the piston rod 104 causes the boom member 82 to pivot in a clockwise direction and as viewed in FIG. 3 for advancing the shearing head to the extended position shown in solid lines while retraction of the piston rod 104 causes the boom member 82 to be pivoted in a counter-clockwise direction for raising the shearing head to the retracted position. The arrangement is such that when the shearing head has been raised to its retracted position, it overlies and may rest on the rigid frame member 58. This arrangement protects the articulated boom structure and actuating mechanism associated therewith from the shock loads which might otherwise be imparted thereto during movement of the vehicle over the road or rough terrain from one location to another.

It is to be noted that the mechanism 32 is constructed so that the shearing head 30, when in its lowered operative position, may be further extended and retracted generally horizontally and transversely with respect to the longitudinal axis of the vehicle. This permits an operator greater tolerance in the distance between the vehicle and a tree to be felled so that proper positioning of the vehicle may be accomplished easily. In order to adjust the shearing head horizontally, the mechanism 32 is provided with another hydraulically operated cylinder 112 and complementary piston rod 114. The cylinder 112 is generally vertically disposed between the base members 62 and 64 and has an upper end thereof pivotally connected to the base members by a shaft 116. An outer or lower end of the piston rod 114 is pivotally connected by pin 118 to one corner of a bell crank 120. An intermediate corner of the bell crank is pivoted between the base members 62 and 64 on a shaft 122 and an opposite end of the bell crank is connected by shaft 124 with rods or links 126 and 128 to upper ends of the outer boom members 88 and 90. Suitable pivot pins 130 are provided for connecting the rods 126 and 128 with the ends of the boom members 88 and 90. As shown in FIG. 3, the connecting rods 126 and 128 embrace the base members 62 and 64 which are provided with elongated arcuate slots 132 for accommodating outer ends of the pivot means or shaft 124 which connects the rods 126 and 128 with the bell crank 120.

When the piston rod 114 is retracted as shown in

FIG. 3, the bell crank 120 is pivoted in a clockwise direction for extending the connecting rods 126 and 128 and causing the outer boom members 88 and 90 to pivot in a clockwise direction about the shaft 86 for moving the shearing head 30 generally horizontally toward the left. In the event an operator wishes to extend the shearing head generally horizontally toward the right as viewed in FIG. 3, the cylinder 112 is actuated for extending the piston rod 114 which causes the bell crank 120 to pivot in a counter-clockwise direction. This, in turn, causes the outer boom members 88 and 90 to pivot in a counter-clockwise direction about the shaft 86 and the shearing head is moved toward the right. During this adjustment the cylinder 102 may also be actuated for selectively extending or retracting the rod 104 and thereby adjusting the vertical height of the shearing head as desired.

The shearing head 30 has a blade member 134 adapted to be actuated by a hydraulic cylinder 136 as fully described in the aforementioned copending application. During the felling of a tree, blade member 134 is forced through the tree and it has been found that during this action, the blade member 134 may tend to turn or twist in response to resistance encountered from various portions of the tree. As previously indicated hereinabove, the universal pivot means 92 enables the head unit to twist or turn without causing undue deflection in or injury to the articular boom structure. In addition, the aforementioned limited pivotal movement of the base members 62 and 64 which is permitted by the elongated slot 78 in the link 70 provides for limited vertical adjustment of the shearing head during movement of the shearing blade through a tree. In other words, the shearing head is supported for substantially universal pivotal movement and also for limited vertical adjustment so as to minimize any possibility of injury to the mechanism during a shearing operation.

As described in the aforementioned copending applications, a tree which is felled by the shearing head 30 is directed forwardly along the side of the vehicle and is caught by the mechanism 34 which serves to lift one end portion of the tree trunk up onto the carriage 36 of the feeding means 38. At the same time the lifting mechanism 34 positions the tree in association with the delimbing mechanism 42 which is shown in FIGS. 1 and 5–11.

Referring particularly to FIGS. 1 and 5 it is seen that the delimbing mechanism 42 comprises a fixed frame structure 138 mounted on or adjacent the lower and forward end of the track structure 40 of the feeding means. An arched arm or frame member 140 is pivoted on a shaft 142 mounted on an upper end portion of the frame structure 138. The pivoted arch frame member 140 carries a drum 144 at its outer end on a shaft 146, on which drum a flexible chain-like blade structure 148 is adapted to be wound as will be described more fully below. Reference is made to the aforementioned prior applications for a detailed disclosure with respect to the blade structure 148. It suffices to state herein that the blade structure comprises a plurality of rigid chain links 150 pivotally connected by pins 152 and presenting sharpened knife blade segments 154 which are adapted to combine with each other to provide a substantially circular cutting edge which is adapted to be adjusted to conform to the various diameters of a tree trunk. One end of the chain-like structure 148 is secured to the periphery of the drum unit 144 by a pin 156 as shown in FIGS. 10 and 11 and an opposite end of the blade structure is connected by a pin 158 to the frame structure 138.

The arched arm or frame member 140 is adapted to be pivoted between the opened position shown in solid lines and a closed position shown in broken lines. This is accomplished by means of a hydraulically actuated cylinder 160 having an associated piston rod 162, which cylinder has a lower end thereof pivotally supported on a pin 164 fixed with respect to the frame structure 138. The piston rod 162 is connected by shaft 166 to short lever arms or lugs 168 fixed to the pivoted frame member 140 and extending downwardly from the shaft 142. Thus when the piston rod 162 is retracted, the lever arms 168 and the frame member 140 connected thereto, are pivoted in a clockwise direction to the opened position shown in solid line in FIG. 5. When the piston rod 162 is extended, the frame member 140 is pivoted in a counter-clockwise direction to the closed position.

It will be observed that when the frame member 140 is in the raised or opened position, a relatively wide open mouth is defined between the outer end of the frame member 140 and an inclined plate 170 on the lower end of the frame structure 138 through which a tree may be relatively easily inserted. The plate 170 provides an inclined cam surface along which the tree may easily slide to a generally V-shaped seat 172 which is adapted to retain a tree trunk positioned thereon by the lifting mechanism until the delimbing mechanism is actuated. It will be appreciated that when the tree trunk is inserted through the open mouth of the delimbing mechanism, the flexible chain-like blade structure 148 is forced inwardly and when the arm or frame member 140 is lowered the blade is wrapped substantially around the tree trunk.

While the flexible blade member may be wrapped substantially around the tree trunk, there is usually a slight gap between the ends thereof. The delimbing mechanism is provided with a supplemental blade member 174 for traversing this gap and insuring the provision of a cutting edge entirely around the tree trunk. The blade member 174 has a substantially rigid generally V-shaped edge 176 for conforming generally to the surface of a tree trunk over an extended circumferential area of the tree. The blade member 174 is mounted on the frame structure 138 by a pivot pin 178 for enabling the blade member to be shifted between the retracted position shown in solid lines in FIG. 5 and the raised operative position shown in broken lines. When the blade member 174 is in the retracted position, it is below the seat 172 and disposed so as to avoid interference with a tree while the tree is being raised by the lifting mechanism and deposited in association with the delimbing mechanism. In order to actuate the blade member 174, a resiliently extendable connecting rod device 180 is connected between the blade member and the pin or shaft 166 actuated by the piston rod 162, associated with the cylinder 160. The device 180 has its lower end connected by a pin 182 to a short lever arm 184 on the shaft 178 and rigidly connected with the blade member 174.

The resiliently extendable connecting rod device 180 comprises a tubular member 186 having a piston 188 slidably disposed therein. A rod 190 is connected with the piston and extends upwardly through an apertured and upper end member 192 of the device. A compression spring 194 is disposed between the piston 188 and the upper end member 192 for resiliently urging the piston and the piston rod toward the retracted position as shown best in FIG. 9. A fitting 196 is fixed to the upper end of the piston rod 190, which fitting is formed with an elongated slot 198 through which the shaft 166 extends. When the hydraulic cylinder 160 is actuated for raising and opening the frame member 140 of the delimbing mechanism, the shaft 166 is moved to the lowered position shown in FIGS. 5, 7 and 9 so that the connecting device 180 and the blade member 174 are free to move downwardly until further movement is arrested by a stop element 200 secured to the frame structure 138. It will be noted that when the blade member 174 is lowered and the arm 140 is raised, the shaft 166 is located at the lower end of the slot 198.

When a tree has been lifted into the delimbing mechanism, the cylinder 160 is actuated for closing the arm or frame member 140 and, at the same time, shifting the pin 166 upwardly. During the first portion of this movement, the pin rides up the slot 198 without engaging an upper end 202 of the fitting 196. As a result the arm member 140 is moved downwardly around and the flexible chain blade structure is wrapped substantially around a tree before the blade member 174 is raised into engagement with the bottom surface of the tree. Continued upward movement of the pin or shaft 166 causes the arm or frame member 140 to be pivoted to a fully closed position and at the same time the pin 166 engages the upper end 202 of the fitting 196 and causes the connecting device 180 to pull the blade member 174 upwardly into engagement with the tree. The arrangement is such that when the pin 166 is in the fully raised position so that the delimbing mechanism is fully closed around a tree, the piston rod 190 will have been pulled upwardly sufficiently to slide the piston 180 up within the tubular member 186 and place the spring 194 under compression. As a result, the blade member 174 is resiliently biased by the spring 194 against the bottom of the tree trunk for enabling the blade member 174 to adapt and adjust itself in accordance with any irregularities in and changes in the shape and diameter of the tree trunk being processed.

The delimbing mechanism is adapted to adjust the effective length of the chain-like blade structure for accommodating variations in the circumference of a tree being processed. More specifically, the chain-like structure is adapted to be wound up on the drum unit 144 and to be unwound therefrom in accordance with the requirements of the particular portion of a tree being processed. As shown best in FIGS. 10 and 11 the drum unit 144 comprises a cylindrical body member 204 fixed between end plates 206 and 208 which are rotatable on and relative to a shaft 210. The shaft has one end supported by a bearing member 212 mounted on one side 214 of the outer end of the frame or arm member 140. An opposite end of the shaft 210 is supported by a bearing 216 mounted in an adapter plate 218 secured to an opposite side 220 of the arm or frame member.

In order to rotate the drum body 204 for winding up the chain-like blade structure which is attached to a lug 222 fixed to the body, a spiral spring 224 is provided. The spring has an outer end 226 operatively interconnected with the drum body by a pin 228 and an inner end 230 interlocked with an abutment 232 on the shaft 210. The spring is constructed and arranged so that the force provided thereby is adapted to rotate the drum for winding up the blade structure. Means are provided for adjusting this force and thereby adjusting the tension in the chain blade structure when the blade structure is wrapped around a tree. More specifically means is provided for rotating the shaft 210 relative to the drum body 204 so as to tighten or loosen the spring 224. This means includes a fitting 234 disposed on an end portion 236 of the shaft 210 adjacent the adapter plate 218 and fixed with respect to the shaft by a key 238 or other suitable means. The fitting 234 is provided with a socket 240 adapted removably to receive a bar or lever 242 which may be used for turning the fitting 234 and thus the shaft 210 for tightening, or if desired, for loosening the spring. The fitting 234 is normally retained against rotation by a screw 244 extending through the adapter plate 218 and into a threaded aperture 246 in the fitting. It is to be understood that when it is desired to adjust the tension in the spring 224, the lever 242 is inserted into the socket 240 whereupon the screw 244 is removed for permitting the operator to turn the shaft. After the shaft has been turned the desired amount, the screw 244 is reapplied. If desired, a plurality of the threaded apertures 246 may be spaced around the fitting 234 selectively for receiving the locking screw 244.

After a tree being processed has been placed on the carriage means 36 of the feeding mechanism and the delimbing mechanism has been closed around the tree as described above, the feeding mechanism is actuated for advancing successive sections of the tree to and through the bucking head or shear structure 44. As shown in FIGS. 1 and 12 through 16, the shearing head 44 comprises a first jaw member 248 supported by fitting assemblies 250 and 251 on a fixed bracket member 253 mounted on track means 40 on and extending upwardly from the track means. These fitting assemblies are identical and as shown best in FIG. 14 include a cylindrical member 252 welded or otherwise secured to the jaw structure 248. A central pin 254 extends through the cylindrical member 252 and is supported by the frame or bracket member 253. Sleeve elements 256 and 258 are provided on the pin and intermediate sleeve elements 260 and 262 formed of rubber or other suitable tough resilient material are provided between the inner sleeve elements and the outer cylindrical member 252. The rubber or resilient material of the members 260 and 262 provides a resilient support for the bucking shear for minimizing shock stresses in the apparatus and improving the efficiency and reliability of the structure.

The jaw structure 248 comprises a pair of spaced apart plate members 264 and 166 having an opening 268 therethrough for accommodating a tree to be severed. The shearing head 44 is provided with a second jaw member 270 in the form of a shearing blade having a cutting edge 272. The jaw or blade member 270 is pivoted by a pin 274 between the plate members 264 and 266 of jaw member 248 for movement toward and away from a margin 276 of the opening 268.

A hydraulic cylinder 278 is disposed for actuating the blade member 270 between the retracted position shown in FIG. 12 and an extended or tree-severing position. The cylinder 278 is pivotally supported by pivot means 280 on the jaw member 248 and a piston rod 282 extending from the cylinder 278 is connected by a pivot pin 284 with an end portion of the blade member spaced substantially away from the pivot 274. The cylinder supporting pivot means 280 is connected between portions 286 and 288 of the jaw member 248, which portions extend laterally substantially equally from the mounting or fitting assemblies 250 and 251. Furthermore, these assemblies are located substantially in a common vertical plane which is adjacent or traverses the margin 276 of the opening 278 against which a tree is forced by the blade member 270 during a severing operation. This arrangement minimizes any tendency of the jaw structure 248 to twist during a tree-severing operation so as to facilitate actuation of the blade member and reduce any possibility of injury to the apparatus.

Bearing blocks 288 are secured to opposite sides of an outer end portion of the blade member 270 for engagement with opposed inner surfaces of the jaw member 248 and thereby guide and support the blade member during movement of the blade member between its retracted and extended positions. Additional bearing blocks 290 are secured to opposite sides of an intermediate portion of the blade member for similarly engaging inner surfaces of the jaw member 248 at a side of the opening 268 opposite from the bearing blocks 288. It is to be noted that since the bearing blocks 288 and 290 are on and movable with the blade member 270 there is no need for relatively long and expensive bearing means along the jaw member 248 whereby the overall structure of the shearing head is simplified.

As previously indicated the shearing head 44 is supported by the units 250 and 251 which are disposed in a substantially common vertical plane adjacent one end of the jaw member 248. In order to minimize twisting forces on the units 250 and 251 which would otherwise be provided by the weight of the shearing head, a support member and cushion 292 is located between an abutment surface 294 provided on a lower edge of the jaw member 248 and a member fixed with respect to the vehicle which, in the embodiment shown in FIG. 12, may be a portion of the feeding means track 40. The cushion member 292 is former from rubber or other suitable resilient material for absorbing shock loads which might otherwise injure the apparatus.

As indicated in FIG. 8, FIGS. 12 and 13, the jaw member 248 is provided with marginal plate members 296 and 298 which extend between and are welded to the side plate members 264 and 266 and function to support the side plate members in spaced apart parallel relationship and to rigidify the jaw structure. The end or edge plate member 298 is relieved to provide an opening 300 adjacent a lower portion thereof for facilitating the escape of woodchips and debris from between the side plate members, which chips and debris may be formed during a tree-severing operation. In order to aid entry of a tree through the opening 268 in the jaw member 248, a funnel-like guide member 302 is secured to the jaw member 248 in alignment with the path of travel of a tree being advanced by the feeding means 38.

While the preferred embodiment of the present invention has been described and shown herein, it is obvious that many details may be changed without departing from the spirit and scope of the appended claims.

The invention is claimed as follows:

1. An apparatus for harvesting trees comprising a self-propelled vehicle including an internal combustion engine having a cooling system comprising a radiator and a fan associated with the radiator, means on said vehicle for felling a standing tree, means on said vehicle for feeding a felled tree along a predetermined path of travel, cutting means on said vehicle for removing portions of a tree being advanced by said feeding means, said fan being disposed substantially facing said cutting means and being driven for causing a flow of air past said radiator and also past said cutting means for cooling the radiator and blowing any debris resulting from a cutting operation from said cutting means, means on said vehicle adjacent said path of travel for severing successive tree sections from the remainder of the tree, and said vehicle including means below said path of travel for receiving and retaining said tree sections.

2. An apparatus for harvesting trees comprising a self-propelled vehicle including an internal combustion engine having a cooling system comprising a radiator and a fan associated with the radiator, cutting means on said vehicle for acting on a tree being processed, said fan being disposed substantially facing said cutting means, and means driving said fan for causing a flow of air past said radiator and also past said cutting means for cooling the radiator and blowing any debris resulting from a cutting operation from said cutting means.

3. An apparatus, as defined in claim 2, wherein said cutting means is disposed adjacent one side of said vehicle and said radiator is disposed at an opposite side of said vehicle generally oppositely from said cutting means.

4. An apparatus, as defined in claim 3, wherein said engine is disposed substantially longitudinally of said vehicle and includes a drive shaft extending generally longitudinally of said vehicle, said fan being disposed for rotation about an axis extending transversely of said vehicle, said apparatus including gear means connected between said drive shaft and said fan for driving the fan.

5. An apparatus, as defined in claim 3, wherein said cutting means and said radiator are disposed adjacent a forward end of said vehicle, said cutting means comprising means for providing a substantially annular cutting edge for encircling a tree and removing limbs from the tree upon feeding movement of the tree relative to the vehicle.

6. An apparatus for harvesting trees comprising a self-propelled vehicle including an internal combustion engine having a cooling system comprising a radiator and a fan associated with the radiator, a tree-felling shear, an articulated boom structure mounted on said vehicle and supporting said shear, means connected with said boom structure for actuating the boom structure for raising and lowering said shear, additional means connected with said boom structure for actuating the boom structure for extending and retracting the shear generally horizontally and transversely of the vehicle when the shear is lowered, cutting means on said vehicle for removing portions of a felled tree being processed, feeding means on said vehicle for feeding the felled tree with respect to said cutting means, said fan being disposed for substantially facing said cutting means and being driven for causing a flow of air past said radiator and also past said cutting means for cooling the radiator and blowing debris resulting from cutting operations from said cutting means.

7. An apparatus for harvesting trees comprising a self-propelled vehicle, a tree-felling shear, an articulated boom structure mounted on said vehicle and connected with and supporting said shear, a first portion of the boom structure having a first end pivotally connected with said base means, a second portion of the boom structure being pivotally connected with a second end on said first portion and also being connected with said felling shear, first means for pivotally actuating a first portion of the boom structure selectively for raising and lowering the shear comprising fluid pressure operable cylinder and piston means extending between said base means and said first portion, and additional means for pivotally actuating a second portion of said boom structure for selectively extending and retracting the shear generally horizontally and laterally of the vehicle comprising additional fluid pressure operable cylinder and piston means connected with said base means and operatively connected with said second portion.

8. An apparatus, as defined in claim 7, wherein said means for actuating said second portion includes a bell crank pivoted intermediate its ends to said base means, one end of said bell crank being pivotally connected to said second mentioned cylinder and piston means, and link means connecting an opposite end of said bell crank with said second boom structure portion.

9. An apparatus, as defined in claim 7, which includes universal joint means connecting said second boom structure portion and said felling shear and supporting said felling shear for free substantial universal pivotal movement relative to the boom structure.

10. An apparatus, as defined in claim 9, wherein said universal joint means is connected with said felling shear adjacent the center of gravity of said felling shear for causing said felling shear to normally assume a generally horizontal position.

11. An apparatus, as defined in claim 7, which includes means resiliently supporting said base means on said vehicle for limited movement relative to the vehicle.

12. An apparatus, as defined in claim 6, which includes a bucking shear disposed adjacent said feeding means for severing successive sections from a felled tree, said bucking shear comprising a fixed jaw member having an opening therethrough for receiving the tree and a second jaw member having a cutting edge thereon shiftably disposed with respect to the first jaw member for severing the tree and forcing the tree against a predetermined margin of said opening during the severing operation, hydraulic cylinder and piston means connected between said jaw members for actuating said second jaw member, and means mounting said bucking shear with respect to said vehicle including spaced fittings secured to said first jaw member and located substantially in a common vertical plane adjacent said margin.

13. An apparatus, as defined in claim 6, wherein said cutting means comprises a flexible blade structure adapted to be supported substantially around a tree so that ends thereof are adjacent each other, a blade member disposed for traversing said end portions of the flexible blade structure for completing encirclement of the tree for removing limbs from the tree when the tree is advanced relative to said vehicle, means mounting said blade member for movement between a tree engaging position and a retracted position, and means for resiliently biasing the blade member toward the tree when the blade member is in the tree engaging position.

14. In an apparatus for processing trees a mechanism for removing limbs from a tree trunk comprising a flexible blade structure, means for wrapping the flexible blade structure around a tree trunk so that ends of the blade structure are adjacent each other, a blade member disposed for traversing said ends of the blade structure and insuring complete encirclement of the tree trunk, said blade structure and blade member combining to provide a substantially annular cutting edge for severing branches from the tree trunk when the blade structure and blade member and the tree trunk are relatively axially moved, means mounting said blade member for movement between a tree-engaging position and a retracted position, and means for resiliently urging said blade member toward the tree trunk when the blade member is in the tree-engaging position.

15. An apparatus, as defined in claim 14, which includes fluid pressure operable cylinder means for actuating said blade member between said retracted position and said tree-engaging position, said means for resiliently urging the blade member toward the tree comprising a resilient connecting device connected between said blade member and said cylinder means.

16. In an apparatus for processing trees and removing limbs from trees, a first frame structure, an arm member pivotally connected to said frame structure and movable between an opened position extending generally away from said frame structure and a closed position in which the arm member and frame structure combine to define an opening through which a tree to be processed may extend, a flexible blade structure having one end secured to said frame structure and an opposite end connected with an outer end of said arm member, said flexible blade structure being adapted to be wrapped substantially around a tree to be processed with the opposite ends of the blade structure adjacent each other when said arm member is in said closed position, a blade member disposed for substantially traversing said opposite ends of the blade structure when the blade structure is wrapped around a tree for insuring complete encirclement of the tree, means mounting said blade member on said frame structure for movement between a retracted position and a tree-engaging position, fluid pressure operated cylinder means connected between said frame structure and arm member for actuating said arm member between its opened and closed positions, and means connecting said blade member and said cylinder means for actuating said blade member toward its tree-engaging position only after said arm member has been moved substantially from its opened position toward its closed position.

17. An apparatus, as defined in claim 16, wherein said means connecting said blade member and said cylinder means comprises spring means for resiliently urging the blade member against a tree.

18. An apparatus, as defined in claim 16, which includes a rotatable drum carried by an outer end of said arm member and connected with an end portion of said flexible blade structure for winding up and unwinding the blade structure in accordance with the circumference of a tree being processed, a shaft rotatably supported on said arm member, said drum being mounted on and rotatable relative to said shaft, means releasably locking said shaft against rotation, spring means connected between said shaft and said drum for resiliently biasing said drum in a direction for winding up the blade structure, and means connected with said shaft for rotating the shaft after release of said locking means for selectively tightening and loosening said spring means.

References Cited by the Examiner
UNITED STATES PATENTS

| | | | |
|---|---|---|---|
| 1,497,676 | 6/1924 | Fink | 83—607 |
| 1,562,045 | 11/1925 | Pels | 83—607 |
| 2,981,301 | 4/1961 | Busch et al. | 144—3 |
| 3,029,848 | 4/1962 | Bombardier | 144—3 |
| 3,059,677 | 10/1962 | Busch et al. | 144—34 X |

WILLIAM W. DYER, Jr., *Primary Examiner.*

WAYMOND D. BRAY, *Assistant Examiner.*